United States Patent [19]

Durenec et al.

[11] 4,411,164
[45] Oct. 25, 1983

[54] ROTARY TO RECIPRICATING MOTION TRANSLATOR

[75] Inventors: Peter Durenec, Annandale; Aubrey J. Dunn, Springfield, both of Va.

[73] Assignee: The United States of America as represented by the Secretary of the Army, Washington, D.C.

[21] Appl. No.: 269,205

[22] Filed: Jun. 2, 1981

[51] Int. Cl.³ .................. F16H 25/08; F01B 9/00
[52] U.S. Cl. ................................... 74/55; 92/138
[58] Field of Search .............. 74/55, 49, 50, 570, 74/569, 567; 92/138; 310/80; 128/24.2, 51-53

[56] References Cited

U.S. PATENT DOCUMENTS

| | | | |
|---|---|---|---|
| 2,256,926 | 9/1941 | Maniscalco | 92/138 X |
| 2,472,647 | 6/1949 | Covins | 92/138 X |
| 2,785,576 | 3/1957 | Paulsmeier | 74/49 X |
| 3,699,952 | 10/1972 | Waters et al. | 310/80 X |

FOREIGN PATENT DOCUMENTS 22694 of 1902 United Kingdom ................. 74/50

*Primary Examiner*—Ernest R. Purser
*Attorney, Agent, or Firm*—Robert P. Gibson; Milton W. Lee; Aubrey J. Dunn

[57] ABSTRACT

A yoke with an elliptical slot in it is driven by a reciprocating motion in a guide by a circular cam carried off-center to a rotating shaft. The minor axis of the ellipse is equal to the cam diameter and is parallel to the direction of reciprocating motion. The major axis is equal to the cam diameter plus twice the off-center distance of the cam. The yoke may be attached to a piston in a compressor by a connecting rod, or may be formed as a portion of the piston.

6 Claims, 2 Drawing Figures

ROTARY TO RECIPRICATING MOTION TRANSLATOR

The invention described herein may be manufactured, used, and licensed by the U.S. Government for governmental purposes without the payment of any royalties thereon.

BACKGROUND OF THE INVENTION

1. Field of the Invention

This invention is in the field of devices for converting rotary motion to reciprocating motion.

2. Description of the Prior Art

The prior art is repleted with various schemes for converting rotary to reciprocating motion, and vice versa. Such schemes have been necessary since at least the invention of the steam engine. In a steam locomotive engine, for example, it is necessary to convert the reciprocating motion of the pistons to the rotary motion of the drive wheels. For a piston-type compressor driven by a rotating motor (such as an electric motor) one must convert the rotating motion of the motor to the reciprocating motion of the compressor piston. As a matter of fact, almost all internal combustion engines, witht the exception of turbine and other rotary types, must convert reciprocating to rotary motion to provide power for their intended use. The usual manner of converting reciprocating to rotary motion (and vice versa) consists of a crankshaft, with a crank thereof connected by a connecting rod to a piston pin carried by a piston. A different arrangement may be employed if one is concerned solely with converting from rotary to reciprocating motion. This arrangement consists of a crankshaft or camshaft rotated by some means, a crankarm or cam carried by such shafts, a yoke arranged for reciprocating motion in a yoke guide as with a slot in the yoke into which the crankarm or cam fits, and a connecting rod between the yoke and the part to be reciprocated. This type of arrangement is seen not only in compressors, but in such devices as hedge clippers, hay mowers, and power looms. All of the above-described arrangements have disadvantages. In the case of the crankshaft, connecting rod, and piston pin arrangement, one has a massive (compared to piston mass) forged connecting rod requiring two journals. Moreover, the rod has a complex motion difficult to balance. In the case of a crankarm or cam in a slotted yoke, the slots have heretofore had straight sides, usually being rectangular, oval, or square. The only yoke not having such straight side of which the instant inventors are aware is shown in U.S. Pat. No. 21,911 of Oct. 26, 1858, wherein the yoke has a slot with curved sides between straight ends. None of the prior art converters are able to obtain the motion which is obtained by the instant invention; specifically, rotary motion is converted to a sine wave reciprocating motion.

SUMMARY OF THE INVENTION

The invention is a device for converting rotary motion to a sine wave reciprocating motion and includes a circular cam carried off-center of a rotating shaft and fitting into an elliptical slot in a yoke or piston, and is also a compressor using such a device. In the case of a yoke, the yoke is carried by a yoke guide, and a connecting rod connects the yoke to a piston in a cylinder. Alternatively, yoke and connecting rod may be omitted in favor of an elliptical slot in a portion of a compressor piston.

DESCRIPTION OF PREFERRED EMBODIMENTS

Figure 1:
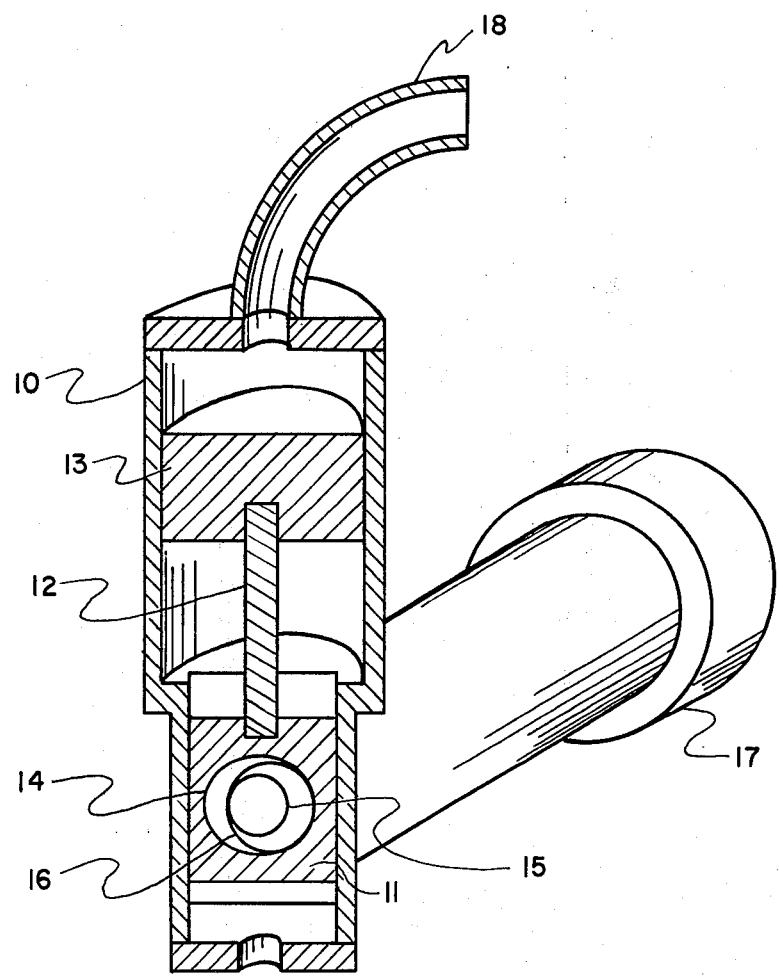
FIG. 1 shows a cutaway view of one embodiment of the invention.

The invention may be best understood when this description is taken in conjunction with the drawings. FIG. 1 shows a compressor with the inventive drive device and includes housing 10 with yoke 11, connecting rod 12, and piston 13 therein. Yoke 11 is guided for motion by yoke-guide portion 10a of housing 10 and has an elliptical slot with its minor axis coincident to a central longitudinal axis running through the yoke, the connecting rod, and the piston. Inside slot 11 is circular cam 15 carried by shaft 16. Shaft 16 is carried by and rotatable by motor 17; the axis of the shaft is normal to and intersects the previously-mentioned central longitudinal axis. The center of cam 15 is offset from the shaft axis by some predetermined distance. The minor axis of slot 11 is equal to the diameter of the cam, and the major axis thereof is equal to the diameter plus twice the predetermined distance. As shaft 16 rotates at a constant angular velocity, cam 15 imparts a sine wave motion to yoke 11, with the amplitude of the sine wave equal to the predetermined distance. The compressor thus yields a sine-shaped pressure wave at outlet 18. This type of compressor, with no valves, is usable in a split-cycle cryogenic refrigeration system such as shown in U.S. Pat. No. 4,143,520 of Mar. 13, 1979. The sine wave pressure wave as produced by the instant compressor is particularly applicable to such a system. Obviously, if desired, intake and exhaust valves could be used with the compressor, depending upon the particular application for which it is used. Also, the yoke may be slotted or otherwise formed to mate with a corresponding ridge or the like in housing portion 10a.

Figure 2:
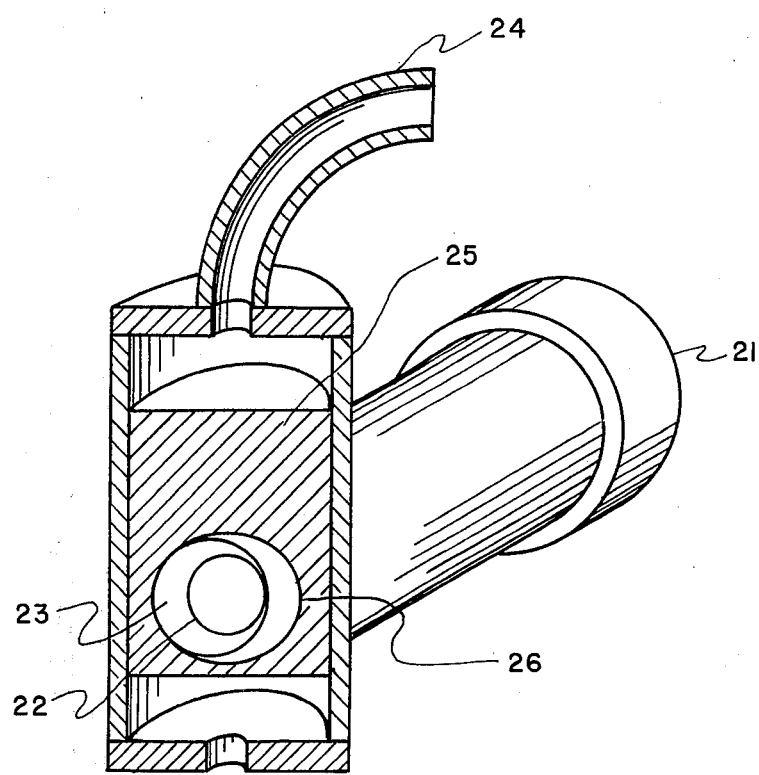
FIG. 2 shows a cutaway view of another embodiment of the invention.

The embodiment of the invention as shown by FIG. 2 is similar in some respects to that of FIG. 1. I.e., it includes housing 20, motor 21, shaft 22 driven by motor 21, circular cam 23 carried by shaft 22, and outlet 24; these items respectively correspond to items 10, 17, 16, 15 and 18 of FIG. 1. FIG. 2 though, instead of piston, yoke, and connecting rod as shown in FIG. 1, uses piston 25 with elliptical slot 26 into which cam 23 fits. This piston is a solid of revolution, with the center of slot 26 passing through and normal to the axis of revolution. The various comments about valves, etc. as applied to the FIG. 1 embodiment equally apply to the FIG. 2 embodiment.

Although we have described our invention as being particularly useful with a compressor, it could obviously be used in other schemes that require simple rotary-to-reciprocating motion transducers. For example, mowing machines, or weaving machines may use our invention to advantage.

We claim:

1. A device for converting rotary motion to reciprocating motion including:
   a shaft capable of rotating about a central longitudinal first axis;
   a circular cam on said shaft with its center offset by a predetermined distance from said first axis;

a yoke assembly including a yoke with an elliptical slot therein, whereby said cam fits into said slot, and a yoke guide which supports said yoke for reciprocating motion along a second axis normal to said first axis and whereby, as said shaft is rotated at a constant angular velocity about said first axis, said yoke reciprocates with a sine wave motion along said second axis.

2. A device as recited in claim 1 wherein said elliptical slot has minor and major axes respectively equal to the diameter of said cam and equal to said diameter plus twice said predetermined distance and whereby said minor axis is parallel to said second axis.

3. A compressor having a housing and including:
   at least one cylinder in said housing with a respective piston therein;
   a drive shaft supported for rotary motion about a central longitudinal first axis;
   a yoke supported by a yoke guide in said housing whereby said yoke has an elliptical slot therein and is capable of reciprocating motion along a second axis normal to said first axis;
   a circular cam on said shaft with its center offset from said first axis by a predetermined distance whereby said cam is in said slot and, as said shaft is rotated at a constant angular velocity about said first axis, said cam causes said yoke to reciprocate with a sine wave motion along said second axis.

4. A compressor as recited in claim 3 wherein said elliptical slot has minor and major axes respectively equal to the diameter of said cam and equal to said diameter plus twice said predetermined distance and whereby said minor axis is parallel to said second axis.

5. A compressor having a housing and including:
   at least one cylinder in said housing with a respective piston therein, wherein said piston is a solid of revolution about a longitudinal first axis, and has an elliptical slot therethrough with the center line of said slot normal to and passing through said first axis;
   a drive shaft supported by said housing for rotary motion about a center longitudinal second axis normal to said first axis and parallel to the center line of said slot;
   a circular cam on said shaft with its center offset from said second axis by a predetermined distance and fitting into said slot whereby, as said shaft is rotated at a constant angular velocity about said second axis, said cam causes said piston to reciprocate with a sine wave motion along said first axis.

6. The compressor as defined in claim 5 wherein said elliptical slot has minor and major axes respectively equal to the diameter of said cam and equal to said diameter plus twice said predetermined distance and whereby said minor axis is parallel to said first axis.

* * * * *